United States Patent
Mehas et al.

(10) Patent No.: US 11,770,157 B2
(45) Date of Patent: Sep. 26, 2023

(54) WIRELESS POWER TRANSMITTER IMPLEMENTING MULTIPLEXING FOR MONITORING CIRCUITRY IN A SEMICONDUCTOR DEVICE

(71) Applicant: Renesas Electronics America Inc., Milpitas, CA (US)

(72) Inventors: Gustavo James Mehas, Mercer Island, WA (US); Giovanni Figliozzi, Zurich (CH)

(73) Assignee: Renesas Electronics America Inc.

( * ) Notice: Subject to any disclaimer, the term of this patent is extended or adjusted under 35 U.S.C. 154(b) by 36 days.

(21) Appl. No.: 17/680,794

(22) Filed: Feb. 25, 2022

(65) Prior Publication Data

US 2023/0275619 A1   Aug. 31, 2023

(51) Int. Cl.
*H02J 50/12* (2016.01)
*H02J 50/40* (2016.01)
*H02J 50/60* (2016.01)
*H04B 5/00* (2006.01)

(52) U.S. Cl.
CPC ............ *H04B 5/0037* (2013.01); *H02J 50/12* (2016.02); *H02J 50/40* (2016.02); *H02J 50/60* (2016.02); *H04B 5/0087* (2013.01)

(58) Field of Classification Search
CPC .. H02J 50/10; H02J 50/12; H02J 50/40; H02J 50/402; H02J 50/60; H02J 50/80; H04B 5/0031; H04B 5/0037; H04B 5/0087
See application file for complete search history.

(56) References Cited

U.S. PATENT DOCUMENTS

| | | | |
|---|---|---|---|
| 2009/0001941 A1* | 1/2009 | Hsu | H02J 50/402 323/211 |
| 2012/0161530 A1* | 6/2012 | Urano | H04B 5/0087 307/104 |
| 2014/0015329 A1* | 1/2014 | Widmer | B60L 53/37 307/104 |
| 2017/0033609 A1* | 2/2017 | Nakamura | H02J 50/12 |
| 2020/0091836 A1* | 3/2020 | Lee | H02M 3/158 |
| 2020/0094697 A1* | 3/2020 | Nagata | B60L 53/37 |
| 2020/0328627 A1* | 10/2020 | Stingu | H02J 50/12 |
| 2021/0124078 A1* | 4/2021 | Widmer | G06F 18/217 |

* cited by examiner

*Primary Examiner* — Levi Gannon
(74) *Attorney, Agent, or Firm* — SCULLY, SCOTT, MURPHY & PRESSER, P.C.

(57) ABSTRACT

In an embodiment, a semiconductor device is disclosed that comprises a multiplexer. The multiplexer is configured to receive signals from each of a plurality of transmission coils of a wireless power transmitter as inputs and to output an output signal based at least in part on one of the signals. The semiconductor device further comprises an attenuator connected to the multiplexer that is configured to adjust a voltage of the output signal. The attenuator comprises a variable resistance. The semiconductor device further comprises a plurality of pull down circuits each corresponding to one of the transmission coils. The pull down circuits are configured to selectively clamp the signals received from the corresponding transmission coils to ground.

20 Claims, 4 Drawing Sheets

WIRELESS POWER TRANSMITTER IMPLEMENTING MULTIPLEXING FOR MONITORING CIRCUITRY IN A SEMICONDUCTOR DEVICE

BACKGROUND OF THE SPECIFICATION

The present disclosure relates in general to apparatuses and methods for communication between wireless power transmitters and wireless power receivers.

Wireless power systems often include a power transmitter and a power receiver. When a transmission coil of the power transmitter and a receiver coil of the power receiver are positioned close to one another they form a transformer that facilitates inductive transmission of an alternating current (AC) power between the power transmitter and the power receiver. The power receiver often includes a rectifier circuit that converts the AC power into a direct current (DC) power that may be utilized for various loads or components that require DC power to operate. The power transmitter and the power receiver also utilize the transformer to exchange information or messages using various modulation schemes. For example, the power receiver may include a resonant circuit having one or more capacitors and may switch in or switch out a different number of capacitors of the resonant circuit to generate amplitude shift key (ASK) signals and encode messages in the ASK signals. The power receiver can transmit the ASK signals to the power transmitter to communicate with the power transmitter via the transformer. The power transmitter decodes the messages from the ASK signals received from the receiver and encodes response messages in frequency shift key (FSK) signals that may be transmitted back to the power receiver via the transformer.

Foreign object detection (FOD) circuitry is utilized to detect when foreign objects such as e.g., coins, paper clips, keys, aluminum foil, metallic objects, magnetic objects or any other objects, that may affect or be affected by the magnetic field generated by the power transmitter are positioned within the region where the magnetic field will be generated either before, during or after power transfer. However, in some cases, the accuracy of the FOD may be impacted due to the large difference between the voltage of the power transfer, e.g., in some cases up to and exceeding 400 volts (V), and the measurement voltage of the FOD circuit, e.g., a relatively low voltage such as 50 milli-volts (mV).

SUMMARY

In an embodiment, a semiconductor device is disclosed that comprises a multiplexer. The multiplexer is configured to receive signals from each of a plurality of transmission coils of a wireless power transmitter as inputs and to output an output signal based at least in part on one of the signals. The semiconductor device further comprises an attenuator connected to the multiplexer that is configured to adjust a voltage of the output signal. The attenuator comprises a variable resistance. The semiconductor device further comprises a plurality of pull down circuits each corresponding to one of the transmission coils. The pull down circuits are configured to selectively clamp the signals received from the corresponding transmission coils to ground.

In another embodiment, a wireless power transmitter is disclosed that comprises a controller. The controller is configured to cause a first pull down circuit of the wireless power transmitter to clamp a first transmission coil of a plurality of transmission coils to ground where the plurality of transmission coils are connected to the wireless power transmitter. The controller is further configured to cause a resistance of an attenuator of the wireless power transmitter to be set to a target resistance value. The controller is further configured to control a multiplexer of the wireless power transmitter to transition from a selection of the first transmission coil to a selection of a second transmission coil of the plurality of transmission coils for output by the multiplexer. The multiplexer is configured to output a signal based at least in part on the selection of the second transmission coil. The controller is further configured to cause a second pull down circuit of the wireless power transmitter to unclamp the second transmission coil from ground and to cause the resistance of the attenuator to be progressively adjusted until a voltage of the signal is within a target voltage range. The controller is further configured to receive monitoring data from a monitoring circuit of the wireless power transmitter. The monitoring circuit being configured to generate the monitoring data based at least in part on the signal.

In another embodiment, a wireless power transmitter is disclosed that comprises a plurality of transmission coils and a semiconductor device. The semiconductor device comprises a multiplexer. The transmission coils are connected to the multiplexer as inputs. The multiplexer is configured to select one of the transmission coils and output a signal based at least in part on the selected one of the transmission coils. The semiconductor device further comprises an attenuator connected to the output of the multiplexer. The attenuator comprises a variable resistance. The semiconductor device further comprises a monitoring circuit connected to the output of the multiplexer and configured to measure at least one characteristic of the selected one of the transmission coils based at least in part on the signal output by the multiplexer.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
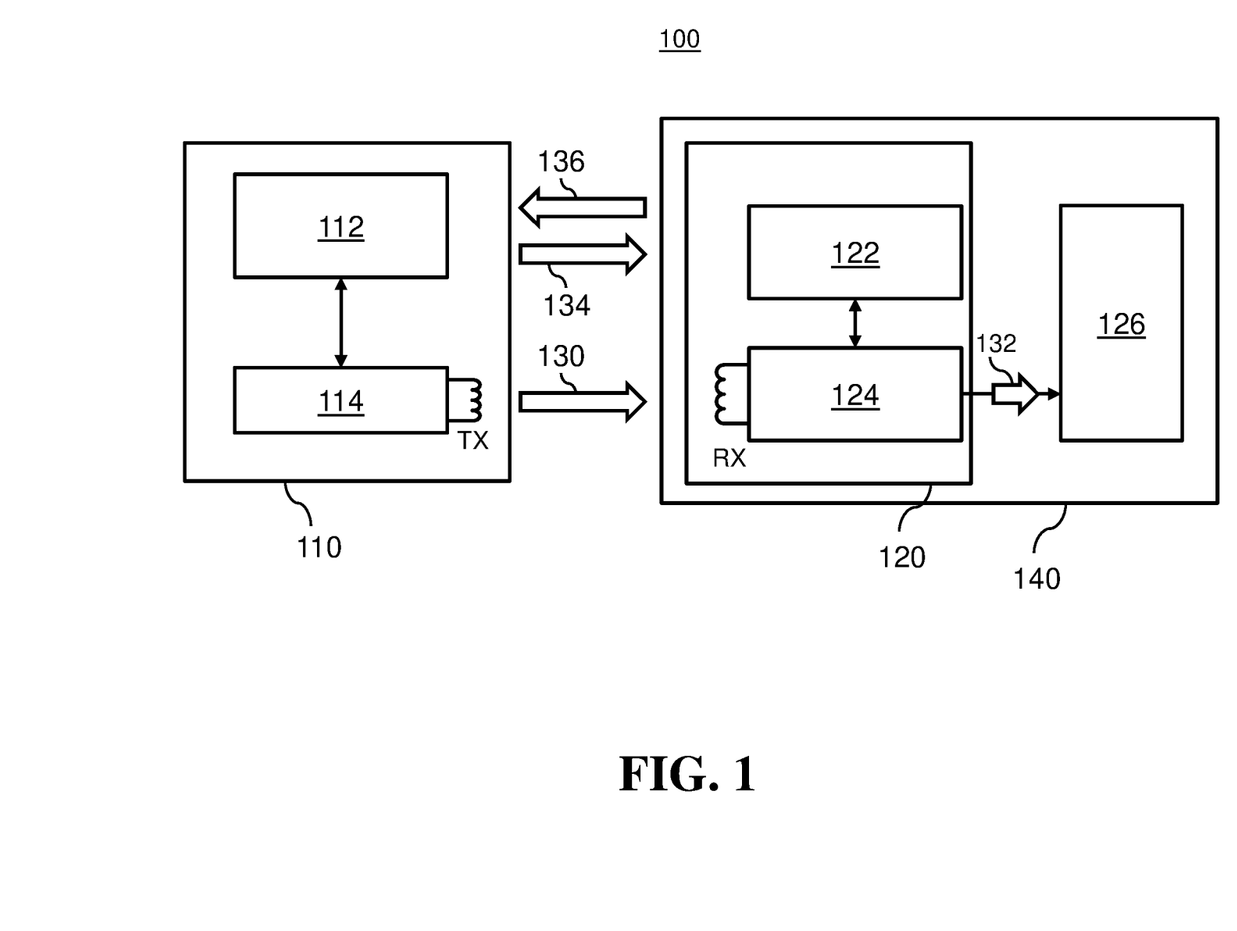
FIG. 1 is a block diagram of an example system for wireless power transfer according to an embodiment.

FIG. 1 is a diagram showing an example system 100 that implements wireless power transfer and communication according to an illustrative embodiment. System 100 comprises a power transmitter 110 and a power receiver 120 that are configured to wirelessly transfer power and data therebetween via inductive coupling. While described herein as power transmitter 110 and power receiver 120, each of power transmitter 110 and power receiver 120 may be configured to both transmit and receive power or data therebetween via inductive coupling.

Power transmitter 110 is configured to receive power from one or more power supplies 116 (FIG. 2) and to transmit AC power to power receiver 120 wirelessly. For example, power transmitter 110 may be configured for connection to a power supply 116 such as, e.g., an AC power supply or a DC power supply. Power transmitter 110 comprises a controller 112 and a power driver 114.

Controller 112 is configured to control and operate power driver 114. Controller 112 comprises, for example, a processor, central processing unit (CPU), field-programmable gate array (FPGA) or any other circuitry that is configured to control and operate power driver 114. While described as a CPU in illustrative embodiments, controller 112 is not limited to a CPU in these embodiments and may comprise any other circuitry that is configured to control and operate power driver 114. In an example embodiment, controller 112 is configured to control power driver 114 to drive a coil TX of the power driver 114 to produce a magnetic field. Power driver 114 is configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards. Controller 112 may be configured as a separate component from power driver 114 or may be included as a part of power driver 114.

Power receiver 120 is configured to receive AC power transmitted from power transmitter 110 and to supply the power to one or more loads 126 or other components of a destination device 140. Destination device 140 may comprise, for example, a computing device, mobile device, mobile telephone, smart device, tablet, wearable device or any other electronic device that is configured to receive power wirelessly. In an illustrative embodiment, destination device 140 comprises power receiver 120. In other embodiments, power receiver 120 may be separate from destination device 140 and connected to destination device 140 via a wire or other component that is configured to provide power to destination device 140.

Power receiver 120 comprises a controller 122 and a power rectifier 124. Controller 122 comprises, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. For example, power rectifier 124 is configured to rectify AC power received from coil RX into DC power which may then be supplied to load 126.

As an example, when power receiver 120 is placed in proximity to power transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126. Load 126 may comprise, for example, a battery charger that is configured to charge a battery of the destination device 140, a DC-DC converter that is configured to supply power to a processor, a display, or other electronic components of the destination device 140, or any other load of the destination device 140.

Power transmitter 110 and power receiver 120 are also configured to exchange information or data, e.g., messages, via the inductive coupling of power driver 114 and power rectifier 124. For example, before power transmitter 110 begins transferring power to power receiver 120, a power contract may be agreed upon and created between power receiver 120 and power transmitter 110. For example, power receiver 120 may send communication packets or other data to power transmitter 110 that indicate power transfer information such as, e.g., an amount of power to be transferred to power receiver 120, commands to increase, decrease, or maintain a power level of AC power 130, commands to stop a power transfer, or other power transfer information. In another example, in response to power receiver 120 being brought in proximity to power transmitter 110, e.g., close enough such that a transformer may be formed by coil TX and coil RX to facilitate power transfer, power receiver 120 may be configured to initiate communication by sending a signal to power transmitter 110 that requests a power transfer. In such a case, power transmitter 110 may respond to the request by power receiver 120 by establishing the power contract or beginning power transfer to power receiver 120, e.g., if the power contract is already in place.

Power transmitter 110 and power receiver 120 may transmit and receive communication packets, data or other information via the inductive coupling of coil TX and coil RX. As an example, communication packet sent from power transmitter 110 to power receiver 120 may comprise frequency shift key (FSK) signals 134. FSK signals 134 are frequency modulated signals that represent digital data using variations in the frequency of a carrier wave. Communication packets sent from power receiver 120 to power transmitter 110 may comprise amplitude shift key (ASK) signals 136. ASK signals 136 are amplitude modulated signals that represent digital data using variations in the amplitude of a carrier wave. While power transmitter 110 is described as sending FSK signals 134 and power receiver 120 is described as sending ASK signals 136, in other embodiments, power receiver 120 may alternatively send FSK signals and power transmitter 110 may alternatively send ASK signals. Any other manner of transmitting communication packets, data or other information between power transmitter 110 and power receiver 120 may alternatively be used.

Foreign object detection (FOD) circuitry is utilized to detect when foreign objects such as e.g., coins, paper clips, keys, aluminum foil, metallic objects, magnetic objects or any other objects, that may affect or be affected by the magnetic field generated by the power transmitter are positioned within the region where the magnetic field will be generated either before, during or after power transfer.

FOD circuitry is configured to monitor the transmission coil of the power transmitter for changes in the quality (Q) factor, inductance, resistance or other properties of the transmission coil. For example, FOD circuitry that is configured to monitor the Q factor of the transmission coil is sometimes referred to as QFOD circuitry. QFOD circuitry often performs measurements at a relatively low voltage, e.g., 50 milli-volts (mV). However, during power transfer, the voltage on the transmission coil may exceed 400 volts (V).

Where multiple transmission coils are being monitored by the QFOD circuitry, such a large difference in the magnitude of the power transfer voltage as compared to the measurement voltage may make it difficult to manage multiplexing between the different coils in a manner that allows the QFOD circuitry to perform accurate measurements without causing significant filtering of the signals due to parasitic poles.

Power drivers sometimes comprise a semiconductor device and power delivery circuitry that is external to the semiconductor device. FOD circuitry may be integrated into the semiconductor device while components external to the semiconductor device may be utilized to perform a portion of the FOD or to prepare signals from the coils for the semiconductor device. For example, in some cases, a multiplexer (MUX) external to the semiconductor device may be disposed between the semiconductor device and the transmission coils to provide an output from only one of the transmission coils to the semiconductor device while also reducing the voltage to a level appropriate for the semiconductor device. In such a case, however, a large parasitic capacitance may occur due to the use of the external MUX.

For example, in some cases, the external MUX may comprise high voltage metal-oxide-semiconductor field-effect transistors (MOSFETs) such as, e.g., 200V MOSFETs. However, such MOSFETs may be difficult to acquire or expensive to manufacture and may not have a sufficiently large drain-source on resistance (RDSON). In other cases, one or more resistor dividers may be disposed between smaller MOSFETs and the transmission coils to reduce the voltage, e.g., from 200V to 50V as an example. However, the impedance of the resistor divider in combination with the parasitic capacitance of the MOSFETs and product poles in the frequency region of interest may materially decrease the accuracy of QFOD measurements. Other cases may use alternative circuitry.

The MOSFETs of the external MUX are utilized as blocking MOSFETs and along with any preceding resistor divider to drive the voltage level down to a desired voltage for measurement at the semiconductor device. For example, the blocking MOSFETs may have resistance of 50 kiloohm (ohm) and a parasitic capacitance of 50 picofarad (pF) which results in a frequency of 64 kilohertz (kHz). However, the resonant frequencies can be as high as 400 kHz which may result in significant signal attenuation on the output signal provided from the MUX to the IC. Signal attenuation may be an issue where, for example, the FOD circuitry is configured to measure signals between 50 mV and 100 mV in order to ensure that the corresponding power receiver does not accidentally activate for charging.

Other power drivers sometimes utilize a common LC node to eliminate the need for a MUX, where L refers to an inductor and C refers to a capacitor. In such a case, the common LC node needs to compensate for variable inductance values where, for example, the wound inductors of the power driver would need to be matched to the LC time constants or programmable capacitors may be utilized for all of the LC time constants to match. In such a case, high voltage MOSFETs and a floating gate driver may be needed to ensure the accuracy of the FOD measurements.

Figure 2:
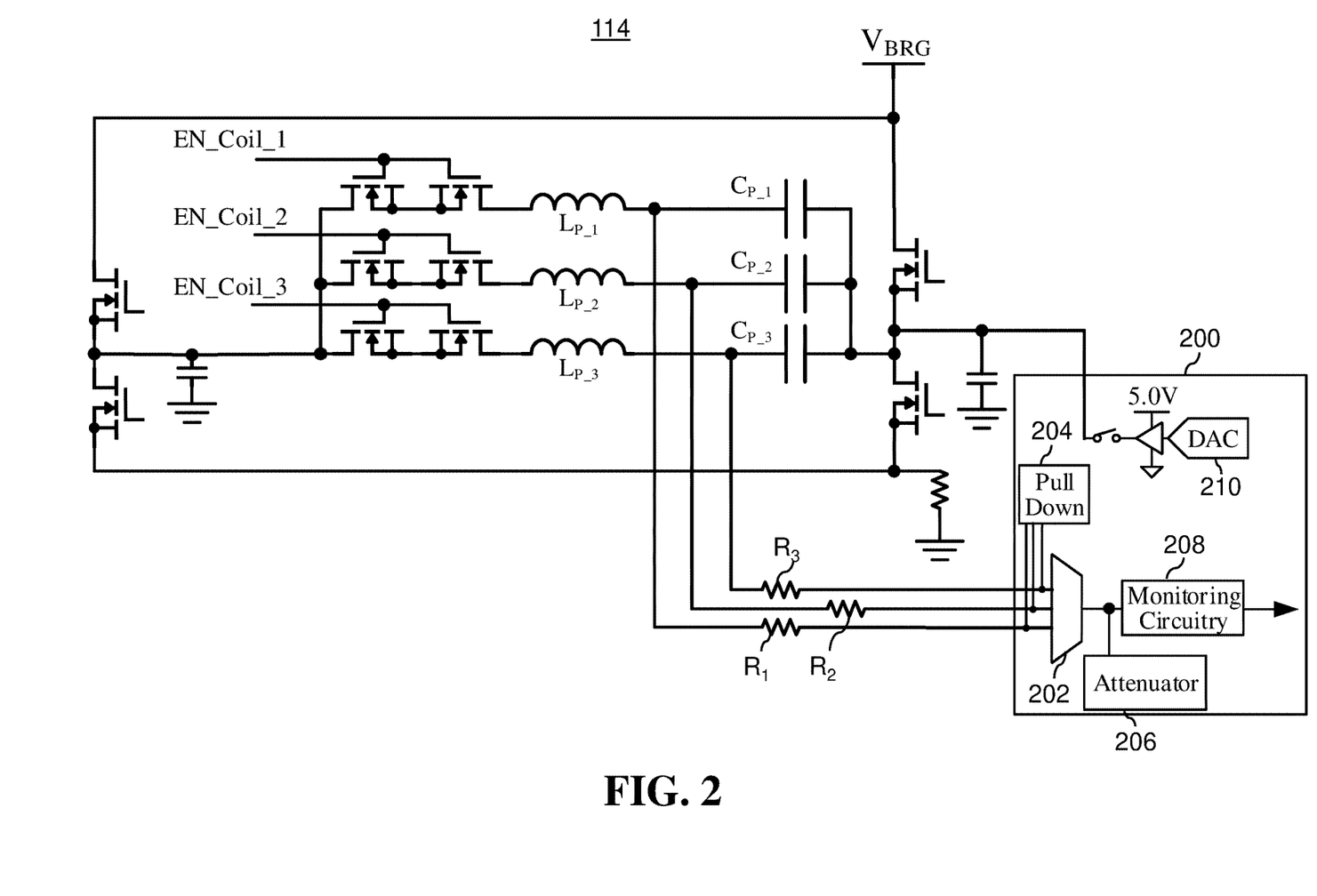
FIG. 2 is a circuit diagram illustrating an example power transmitter of the system of FIG. 1 according to an embodiment.

Referring now to FIG. 2, an illustrative embodiment of power driver 114 that comprises QFOD functionality will now be described.

Power driver 114 comprises power driver circuitry including, e.g., transmission coils $L_{P\_1}$, $L_{P\_2}$ and $L_{P\_3}$, corresponding coil capacitors $C_{P\_1}$, $C_{P\_2}$ and $C_{P\_3}$, field effect transistors (FETs) such as, e.g., MOSFETs, and other circuitry commonly found in power driver circuitry that is configured to drive transmission coils $L_{P\_1}$, $L_{P\_2}$ and $L_{P\_3}$ to generate magnetic fields for transferring power or information to power receiver 120. Each transmission coil $L_{P\_1}$, $L_{P\_2}$ and $L_{P\_3}$ may be activated by a corresponding enable signal, e.g., EN_Coil_1, EN_Coil_2 and EN_Coil_3, that is configured to activate FETs of the power driver 114 that correspond to each transmission coil $L_{P\_1}$, $L_{P\_2}$ and $L_{P\_3}$. While described herein as having three transmission coils, coil capacitors or other circuitry components, power driver 114 may alternatively have more or fewer of these components. As an example, in some embodiments a single transmission coil, two transmission coils, four transmission coils or any other number of transmission coils may be included.

Power driver 114 also comprises a semiconductor device 200, e.g., a printed circuit board (PCB), integrated circuit (IC) or other circuitry, that is configured to perform monitoring and measurement of the characteristics of transmission coils $L_{P\_1}$, $L_{P\_2}$ and $L_{P\_3}$ including, for example, FOD and in some embodiments QFOD. Semiconductor device 200 is configured to perform measurements on each transmission coil $L_{P\_1}$, $L_{P\_2}$ and $L_{P\_3}$ before, during or after power transfer to determine whether a foreign object is located within the magnetic field region of that coil. In some embodiments, semiconductor device 200 may include controller 112.

Semiconductor device 200 comprises a MUX such as, e.g., a transmultiplexer (TMUX) 202, pull down circuits 204, an attenuator 206 and a monitoring circuit 208. Semiconductor device 200 may also comprise other circuitry associated with power driver 114 such as, e.g., a digital to analog converter (DAC) 210. TMUX 202 comprises a relatively low voltage TMUX as compared to the 200V MUX that is external to the semiconductor device mentioned above. For example, TMUX 202 may comprise a 5V TMUX in some embodiments. In other embodiments, a larger or smaller voltage TMUX may alternatively be utilized such as, e.g., a 20V TMUX, a 40V TMUX or TMUXs having other similar voltage ratings.

Monitoring circuit 208 is configured to monitor various characteristics of transmission coils $L_{P\_1}$, $L_{P\_2}$ and $L_{P\_3}$. In some embodiments, for example, monitoring circuit 208 is configured to monitor and measure one or more of FOD, QFOD, voltage demodulation, phase demodulation, current waveform extrapolation or any other monitoring or measurement of characteristics associated with transmission coils $L_{P\_1}$, $L_{P\_2}$ and $L_{P\_3}$.

Figure 3:
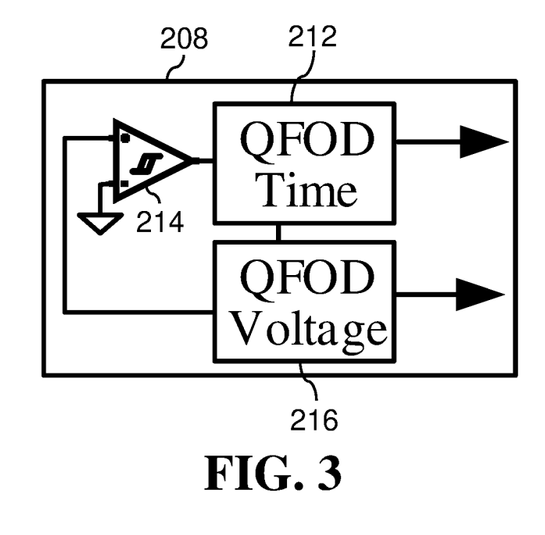
FIG. 3 is a circuit diagram illustrating an example monitoring circuitry of a semiconductor device of the power transmitter of FIG. 2 according to an embodiment.

In an illustrative embodiment, as shown in FIG. 3, monitoring circuit 208 comprises a QFOD time measurement circuit 212 that is fed by an operational amplifier 214 and a QFOD voltage measurement circuit 216. The output from TMUX 202 is fed into operational amplifier 214 and QFOD voltage measurement circuit 216 which are connected to the output from TMUX 202 along with attenuator 206. The outputs of QFOD time measurement circuit 212 and QFOD voltage measurement circuit 216 are provided to controller 112 or another circuit of power transmitter 110.

Figure 4:
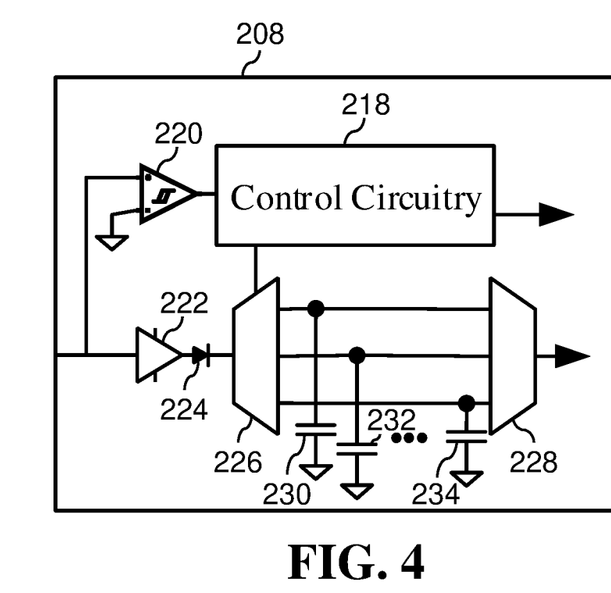
FIG. 4 is a circuit diagram illustrating another example monitoring circuitry of the semiconductor device of the power transmitter of FIG. 2 according to another embodiment.

In another illustrative embodiment, as shown in FIG. 4, monitoring circuit 208 comprises control circuitry 218 that outputs to controller 112 and is fed by an operational amplifier 220 which receives the output of TMUX 202 as an input. control circuitry 218 may also comprise delay counters. In some embodiments, control circuitry 218 is configured to control QFOD measurement using a high speed dedicated state machine.

In this embodiment, monitoring circuit 208 also comprises an operational amplifier 222, which receives the output of TMUX 202 as an input and feeds into a diode 224. Diode 224 feeds feed into a TMUX 226 which splits the signal into three, or any other number, of signals that are fed into a corresponding TMUX 228 which outputs to an analog-to-digital converter (ADC) circuit. A capacitor is connected to ground and to each output of TMUX 226 along with TMUX 228 for each signal, e.g., capacitors 230, 232 . . . and 234, as shown in FIG. 4. The ADC circuit measures the voltages stored on capacitors 230, 232 and 234 via TMUX 226 and converts them to digital data which is utilized by controller 112 along with zero crossing data to determine the Q of the waveform and mathematically calculate a QFOD measurement. In some embodiments, monitoring circuit 208 may comprise some or all of the circuitries shown in FIGS. 3 and 4 together.

In an illustrative embodiment, each transmission coil $L_{P\_1}$, $L_{P\_2}$ and $L_{P\_3}$ is separately connected to TMUX 202 of semiconductor device 200. Respective resistors $R_1$, $R_2$ and $R_3$ are located between transmission coils $L_{P\_1}$, $L_{P\_2}$ and $L_{P\_3}$ and TMUX 202 external to semiconductor device 200 to ensure that the voltage of the signal received by TMUX 202 from each transmission coil $L_{P\_1}$, $L_{P\_2}$ and $L_{P\_3}$ is within the measurement range of semiconductor device 200. An example measurement range may be between 50 mV and 100 mV although other measurement ranges may alternatively be utilized. In illustrative embodiments, resistors $R_1$, $R_2$ and $R_3$ may have a smaller footprint and be less expensive than the MOSFETS of the above examples while having a sufficiently large resistance, e.g., 20 Kohm to 200 Kohm or another large resistance depending on the characteristics of the transmission coils, so as to provide nominal internal electro-static discharge (ESD) protection for semiconductor device 200 and to provide emergency clamping in the event of a power or other failure that results in pull down circuits 204 or TMUX 202 becoming disabled. In some cases, MOSFETs may alternatively be utilized instead of resistors $R_1$, $R_2$ and $R_3$ so long as they have sufficient RDSON and can provide similar resistance values to resistors $R_1$, $R_2$ and $R_3$. As an example, MOSFETs having 200V 2 kOhm values could be utilized for an external MUX in place of resistors $R_1$, $R_2$ and $R_3$ in some embodiments if available. Alternatively, readily available MOSFETs in the 1 to 10 ohm resistance range may be utilized but would require additional external resistance while having a large capacitance that may impact the accuracy of the measurements by monitoring circuitry 208.

Each of pull down circuits 204 comprises a selectively activatable connection to ground, e.g., using MOSFETs or other circuitry, and is connected to a corresponding transmission coil $L_{P\_1}$, $L_{P\_2}$ and $L_{P\_3}$ between TMUX 202 and the corresponding resistor $R_1$, $R_2$ and $R_3$. As an example, when measurements are being taken for transmission coil $L_{P\_1}$, the pull down circuits 204 that are connected to transmission coil $L_{P\_2}$ and $L_{P\_3}$ may be connected to ground to clamp any voltage picked up by the unused transmission coils $L_{P\_2}$ and $L_{P\_3}$ from transmission coil $L_{P\_1}$. In some embodiments, one or more of pull down circuits 204 comprise general purpose input/output (GPIO) structures that are connected to corresponding pins of semiconductor device 200 where, during operation, the pins are connected to ground. In a case where there are fewer transmissions coils than pull down circuits 204, the unused pull down circuits may alternatively be utilized as GPIO structures with the corresponding pins being utilized for other purposes.

Attenuator 206 comprises, for example, a programmable resistor or current source connected between the output of TMUX 202 and ground. In some embodiments, for example, attenuator 206 may comprise a large die area on semiconductor device 200 as compared to other components of semiconductor device 200 such as pull down circuits 204. In an illustrative embodiment, semiconductor device 200 is configured to utilize a single attenuator 206 for all three of the transmission coils $L_{P\_1}$, $L_{P\_2}$ and $L_{P\_3}$. For example, each transmission coil $L_{P\_1}$, $L_{P\_2}$ and $L_{P\_3}$ is fed as an input into TMUX 202, with only one being active at a given time and the others being clamped to ground using corresponding pull down circuits 204. The signal from the active transmission coil is then provided to monitoring circuit 208 and attenuator 206. Attenuator 206 is configured to act as a protective load for monitoring circuit 208 to ensure that high voltage values that may cause damage to monitoring circuit 208 or other components of semiconductor device 200 are mitigated. By using a single attenuator 206 for all of the transmission coils, available die area on semiconductor device 200 may be maximized and efficiently utilized for other purposes since attenuators often take up a large amount of die area on a semiconductor device. In other embodiments, any other number of attenuators 206 may be utilized. For example, in some embodiments, each transmission coil $L_{P\_1}$, $L_{P\_2}$ and $L_{P\_3}$ may have a corresponding attenuator 206, e.g., removing the need for TMUX 202 to select a transmission coil L. In other embodiments, one or more of transmission coils L may have a corresponding attenuator 206 while other transmission coils L have a different corresponding attenuator 206.

A resistance of attenuator 206 is adjustable between a minimum resistance value and a maximum resistance value. For example, in some embodiments, attenuator 206 may have a resistance that is adjustable in a range of 100 kOhm to 1 kOhm. In other embodiments, other resistance values may alternatively be used for the range. Attenuator 206 may also have a high resistance "off" setting such as, e.g., 10M Ohms, in some embodiments. In an illustrative embodiment, controller 112 is configured to adjust the resistance value of attenuator 206. For example, before a transmission coil is activated for measurement, controller 112 is configured to adjust the resistance value of attenuator 206 to a target resistance value that ensures that the voltage received from the transmission coil is mitigated to a level that will not damage monitoring circuit 208 or semiconductor device 200. After the transmission coil is activated, the resistance value of attenuator 206 may be progressively adjusted, e.g., increased or decreased, by controller 112 until the voltage is within a target range for measurement by monitoring circuit 208. As an example, in some embodiments, monitoring circuit 208 may be configured to measure voltages in a particular range, e.g., 50 mV to 100 mV or another range. In one example, the resistance of attenuator 206 may be set by controller 112 to a small value, e.g., a minimum resistance value such as 1 kOhm, and may be gradually increased until the voltage of the signal output by TMUX 202 is within the target range.

In some embodiments, for example, the target resistance value may be the minimum resistance value of attenuator 206. In other embodiments, the target resistance value may be a resistance value that corresponds to a maximum voltage sustainable by monitoring circuit 208 or semiconductor device 200 without damage. In other embodiments, the target resistance value may be a resistance value that is between the resistance value that corresponds to the maximum voltage sustainable by monitoring circuit 208 or semiconductor device 200 without damage and the minimum resistance value of attenuator 206. In other embodiments, the target resistance value may also or alternatively correspond to a maximum voltage that may occur before monitoring circuit 208 would be saturated. In other embodiments, the target resistance value may also or alternatively be large enough to ensure that a signal-to-noise ratio is available to be measured. Any of the above criteria or any other criteria may be used together or individually to determine the target resistance value for attenuator 206.

When performing measurements on transmission coils $L_{P\_1}$, $L_{P\_2}$ and $L_{P\_3}$, controller 112 is configured to activate each transmission coil individually. In order to ensure that multiple coils are not driving voltage onto semiconductor device 200 and monitoring circuit 208 at the same time, a make before break sequence is employed by controller 112 in an illustrative embodiment.

Figure 5:
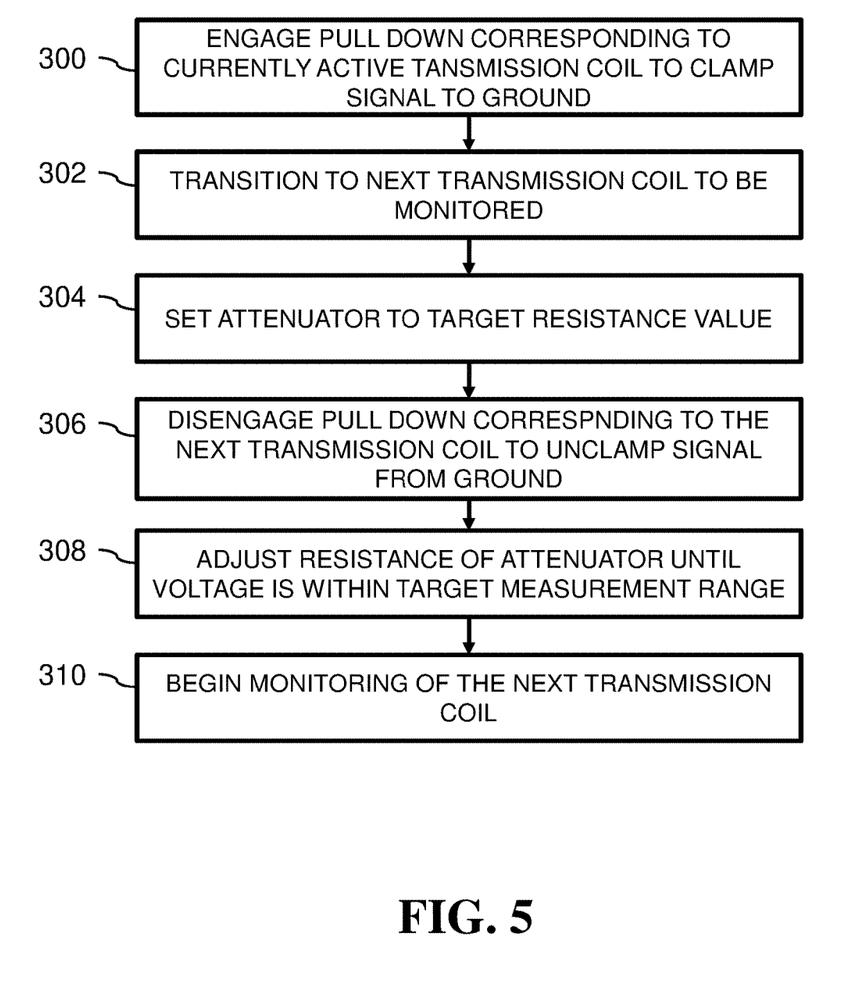
FIG. 5 is a flow diagram of an example process performed by a controller of the power transmitter of FIG. 1 using the power transmitter of FIG. 2 according to an embodiment.

With reference now to FIG. 5 an example process according to the make before break sequence will now be described. The process of FIG. 5 comprises steps 300 through 310. At the start of the example process transmission coil $L_{P\_1}$ is currently active and being monitored with the input of TMUX 202 being set to receive the signal from transmission coil $L_{P\_1}$. Transmission coils $L_{P\_2}$ and $L_{P\_3}$ are connected to their corresponding pull down circuits 204 which are engaged to clamp the signals of transmission coils $L_{P\_2}$ and $L_{P\_3}$ to ground.

At step 300, controller 112 engages the pull down circuit 204 corresponding to transmission coil $L_{P\_1}$ to clamp the signal from transmission coil $L_{P\_1}$ to ground. In some embodiments, transmission coil $L_{P\_1}$ may also be de-activated by controller 112 by disabling the EN_Coil_1 signal in conjunction with the activation of the corresponding pull down circuit 204.

At step 302, controller 112 transitions the input of TMUX 202 from transmission coil $L_{P\_1}$ to the next transmission coil to be monitored, e.g., transmission coil $L_{P\_2}$ in this example. As mentioned above, the signal from transmission coil $L_{P\_2}$ is currently clamped to ground by the corresponding pull down circuit 204.

At step 304, controller 112 sets attenuator 206 to the target resistance value to ensure that monitoring circuit 208 and semiconductor device 200 are protected from an overvoltage that may cause damage at the output signal of TMUX 202. For example, in some embodiments, the resistance of attenuator 206 may be set to the minimum resistance value.

At step 306, controller 112 disengages the pull down circuit 204 corresponding to transmission coil $L_{P\_2}$ to unclamp the signal received from transmission coil $L_{P\_2}$ from ground. In conjunction with disengaging the corresponding pull down circuit 204, controller 112 may also activate transmission coil $L_{P\_2}$ by enabling the EN_Coil_2 signal.

At step 308, controller 112 gradually adjusts the resistance of attenuator 206 until the voltage of the signal output by TMUX 202 is in the target measurement range of monitoring circuit 208, e.g., 50 mV to 100 mV or any other target measurement range. For example, in some embodiments, the resistance of attenuator 206 may be gradually increased until the voltage of the signal output by TMUX 202 is in the target measurement range of monitoring circuit 208.

At step 310, controller 112 begins monitoring the characteristics of transmission coil $L_{P\_2}$ using monitoring circuit 208. For example, in some embodiments, controller 112 may monitor the characteristics of transmission coil $L_{P\_2}$ for foreign objects using QFOD time measurement circuit 212 and QFOD voltage measurement circuit 216. In some embodiments, controller 112 may also or alternatively monitor the characteristics of transmission coil $L_{P\_2}$ using control circuitry 218 or any other circuitry of monitoring circuit 208. In some embodiments, for example, controller 112 may utilize monitoring circuit 208 to monitor characteristics of transmission coil $L_{P\_2}$ including, but not limited to, FOD, QFOD, voltage demodulation, phase demodulation, current waveform extrapolation or any other characteristics of transmission coil $L_{P\_2}$.

While the above example process is described as having particular steps or steps in a particular order, in other embodiments only some of the steps may be performed or the steps may be performed in any other order.

By removing the need for high voltage rating MOSFETs or other components external to semiconductor device 200 for monitoring or measuring the characteristics of the transmission coils, the disclosed embodiments mitigate or reduce the amount of parasitic resistance and capacitance on the signals received from the transmission coils which significantly reduces the effect of filtering on the signals that are provided to monitoring circuit 208 and increases the accuracy of the measurement by monitoring circuit 208. In addition, semiconductor device 200 itself is optimized by only needing to use a single large die area attenuator 206 for the measurement of any number of transmission coils due to the integration of TMUX 202 in semiconductor device 200 to select the active signal and the use of corresponding pull down circuits 204 of semiconductor device 200 to clamp any signal received from the non-active transmission coils to ground. The inclusion of TMUX 202, pull down circuits 204 and attenuator 206 on semiconductor device 200 also allows low cost high rating resistors to be utilized between the transmission coils and TMUX 202 instead of more expensive MOSFETs which may also provide back-up ESD protection and emergency clamping in the event of a power failure or other issue that disables pull down circuits 204 or TMUX 202.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:
1. A semiconductor device comprising:
   a multiplexer, the multiplexer being configured to receive signals from each of a plurality of transmission coils of a wireless power transmitter as inputs and to output an output signal based at least in part on one of the signals;

an attenuator connected to the multiplexer and being configured to adjust a voltage of the output signal, the attenuator comprising a variable resistance; and a plurality of pull down circuits each corresponding to one of the transmission coils, the pull down circuits being configured to selectively clamp the signal received from the corresponding transmission coil to ground.

2. The semiconductor device of claim 1, wherein the plurality of pull down circuits are selectively activatable by a controller to selectively clamp the signals received from the corresponding transmission coil to ground.

3. The semiconductor device of claim 2, wherein the plurality of pull down circuits comprise field effect transistors that are selectively activatable by the controller to selectively clamp the signals received from the corresponding transmission coil to ground.

4. The semiconductor device of claim 1, wherein the variable resistance of the attenuator is adjustable by a controller to adjust the voltage of the output signal.

5. The semiconductor device of claim 4, wherein the semiconductor device further comprises a monitoring circuit, the monitoring circuit being configured to measure characteristics of the output signal when the voltage is within a target measurement range.

6. The semiconductor device of claim 5, wherein the monitoring circuit comprises foreign object detection circuitry, the foreign object detection circuitry being configured to determine whether or not a foreign object is located within a magnetic field generated by the transmission coil based at least in part on the received signals from each of a plurality of transmission coils.

7. The semiconductor device of claim 5, wherein the variable resistance of the attenuator is configured to be progressively adjusted by the controller until the voltage is within the target measurement range.

8. The semiconductor device of claim 5, wherein the variable resistance of the attenuator is configured to be set to a target resistance value by the controller before the controller selectively unclamps the received one of the signals from ground using the corresponding pull down circuit, the target resistance value being configured to cause the voltage of the output signal to be smaller than a maximum voltage sustainable by the semiconductor device.

9. The semiconductor device of claim 8, wherein the controller is configured to set the variable resistance of the attenuator to the target resistance value before causing the multiplexer to transition from outputting the output signal based at least in part on the signal received from a first of the plurality of transmission coils to outputting the output signal based at least in part on the signal received from a second of the plurality of transmission coils.

10. A wireless power transmitter comprising a controller, the controller being configured to:
cause a first pull down circuit of the wireless power transmitter to clamp a first transmission coil of a plurality of transmission coils to ground, the plurality of transmission coils being connected to the wireless power transmitter;
cause a resistance of an attenuator of the wireless power transmitter to be set to a target resistance value;
control a multiplexer of the wireless power transmitter to transition from a selection of the first transmission coil to a selection of a second transmission coil of the plurality of transmission coils for output by the multiplexer, the multiplexer being configured to output a signal based at least in part on the selection of the second transmission coil;
cause a second pull down circuit of the wireless power transmitter to unclamp the second transmission coil from ground;
cause the resistance of the attenuator to be progressively adjusted until a voltage of the signal is within a target voltage range; and
receive monitoring data from a monitoring circuit of the wireless power transmitter, the monitoring circuit being configured to generate the monitoring data based at least in part on the signal.

11. The wireless power transmitter of claim 10, wherein when the controller is configured to determine that each other transmission coil of the plurality of transmission coils is already clamped to ground by a corresponding pull down circuit of the wireless power transmitter before causing the second pull down circuit to unclamp the second transmission coil from ground.

12. A wireless power transmitter comprising:
a plurality of transmission coils; and
a semiconductor device comprising:
a multiplexer, the transmission coils being connected to the multiplexer as inputs, the multiplexer being configured to select one of the transmission coils and output a signal based at least in part on the selected one of the transmission coils;
an attenuator connected to the output of the multiplexer, the attenuator comprising a variable resistance; and
a monitoring circuit connected to the output of the multiplexer and configured to measure at least one characteristic of the selected one of the transmission coils based at least in part on the signal output by the multiplexer.

13. The wireless power transmitter of claim 12, wherein the semiconductor device further comprises a pull down circuit connected to at least one of the transmission coils and being configured to selectively clamp the at least one of the transmission coils to ground.

14. The wireless power transmitter of claim 13, wherein the pull down circuit comprises a field effect transistor, the field effect transistor being activatable to selectively clamp the at least one of the transmission coils to ground.

15. The wireless power transmitter of claim 13, wherein the pull down circuit comprises a plurality of pull down circuits, each pull down circuit being connected to a corresponding transmission coil and being configured to selectively clamp the corresponding transmission coil to ground.

16. The wireless power transmitter of claim 12, further comprising a plurality of resistors, each resistor being connected in serial between a corresponding one of the transmission coils and the semiconductor device.

17. The wireless power transmitter of claim 12, further comprising a controller, the controller being configured to:
adjust the resistance of the attenuator; and
control the multiplexer to select the one of the transmission coils.

18. The wireless power transmitter of claim 17, wherein the monitoring circuit comprises foreign object detection circuitry, the foreign object detection circuitry being configured to measure the signal output by the multiplexer.

19. The wireless power transmitter of claim 18, wherein the foreign object detection circuitry is configured to measure voltages in a voltage range that is smaller than a voltage of the selected one of the transmission coils, the attenuator being configured to adjust the voltage of the signal output by the multiplexer.

20. The wireless power transmitter of claim 19, wherein the controller is configured to progressively adjust the resistance of the attenuator until the voltage of the signal is within the voltage range.

* * * * *